US007006099B2

(12) United States Patent
Gut et al.

(10) Patent No.: US 7,006,099 B2
(45) Date of Patent: Feb. 28, 2006

(54) CACHE SYSTEM AND METHOD FOR GENERATING UNCACHED OBJECTS FROM CACHED AND STORED OBJECT COMPONENTS

(75) Inventors: Ron Abraham Gut, Cambridge, MA (US); Alexis Paul Tzannes, Lexington, MA (US); Edmund Campion Reiter, Lincoln, MA (US)

(73) Assignee: Aware, Inc., Bedford, MA (US)

(*) Notice: Subject to any disclaimer, the term of this patent is extended or adjusted under 35 U.S.C. 154(b) by 554 days.

(21) Appl. No.: 09/774,986

(22) Filed: Jan. 31, 2001

(65) Prior Publication Data

US 2002/0103970 A1    Aug. 1, 2002

Related U.S. Application Data

(60) Provisional application No. 60/225,412, filed on Aug. 15, 2000.

(51) Int. Cl.
*G09G 5/36*    (2006.01)
(52) U.S. Cl. ..................................... 345/557
(58) Field of Classification Search ............ 711/128, 711/170, 124–126, 118–119; 345/557, 552
See application file for complete search history.

(56) References Cited

U.S. PATENT DOCUMENTS

| 6,061,715 | A | 5/2000 | Hawes | |
| 6,192,382 | B1 * | 2/2001 | Lafer et al. | 715/513 |
| 6,314,452 | B1 * | 11/2001 | Dekel et al. | 709/203 |
| 6,363,418 | B1 * | 3/2002 | Conboy et al. | |
| 6,553,393 | B1 * | 4/2003 | Eilbott et al. | |
| 6,631,205 | B1 * | 10/2003 | Melen et al. | 382/154 |

OTHER PUBLICATIONS

Ching-Yung Lin ("Introduction of JPEG 2000", Jul. 13, 2000), http://www.ctr.columbia.edu/~cylin/jpeg2000/intro_jp2.ppt.*
Chim, J.H.P. et al.: "On Caching and Prefetching of Virtual Objects in Distributed Virtual Environments" ACM Multimedia, Proceedings of the International Conference, NY, NY, 1998, pp. 171-180.
Xuguang, Yang et al., "An Optimal and Efficient Soft Caching Algorithm for Network Image Retrieval" Proceedings, 1998, Los Alamitos, CA USA, IEEE Comput. Soc. US., Oct. 4, 1998 pp. 12-16.
PCT International Search Report, PCT/US01/41608 mailed date Jul. 30, 2002.

* cited by examiner

*Primary Examiner*—Matthew C. Bella
*Assistant Examiner*—Hau Nguyen
(74) *Attorney, Agent, or Firm*—Miles & Stockbridge P.C.; Jason H. Vick

(57) ABSTRACT

Methods and apparatus for constructing objects within a cache system thereby allowing the cache system to respond to requested objects that are not initially available within the cache system. One embodiment of the invention caches image files, where the images are divided into components and stored in a format that allows identification and access to the components. The cache system determines that an object, such as an image file, is missing from the cache memory, locates sufficient components from the cache memory and/or external storage, and constructs the object from the located components.

9 Claims, 11 Drawing Sheets

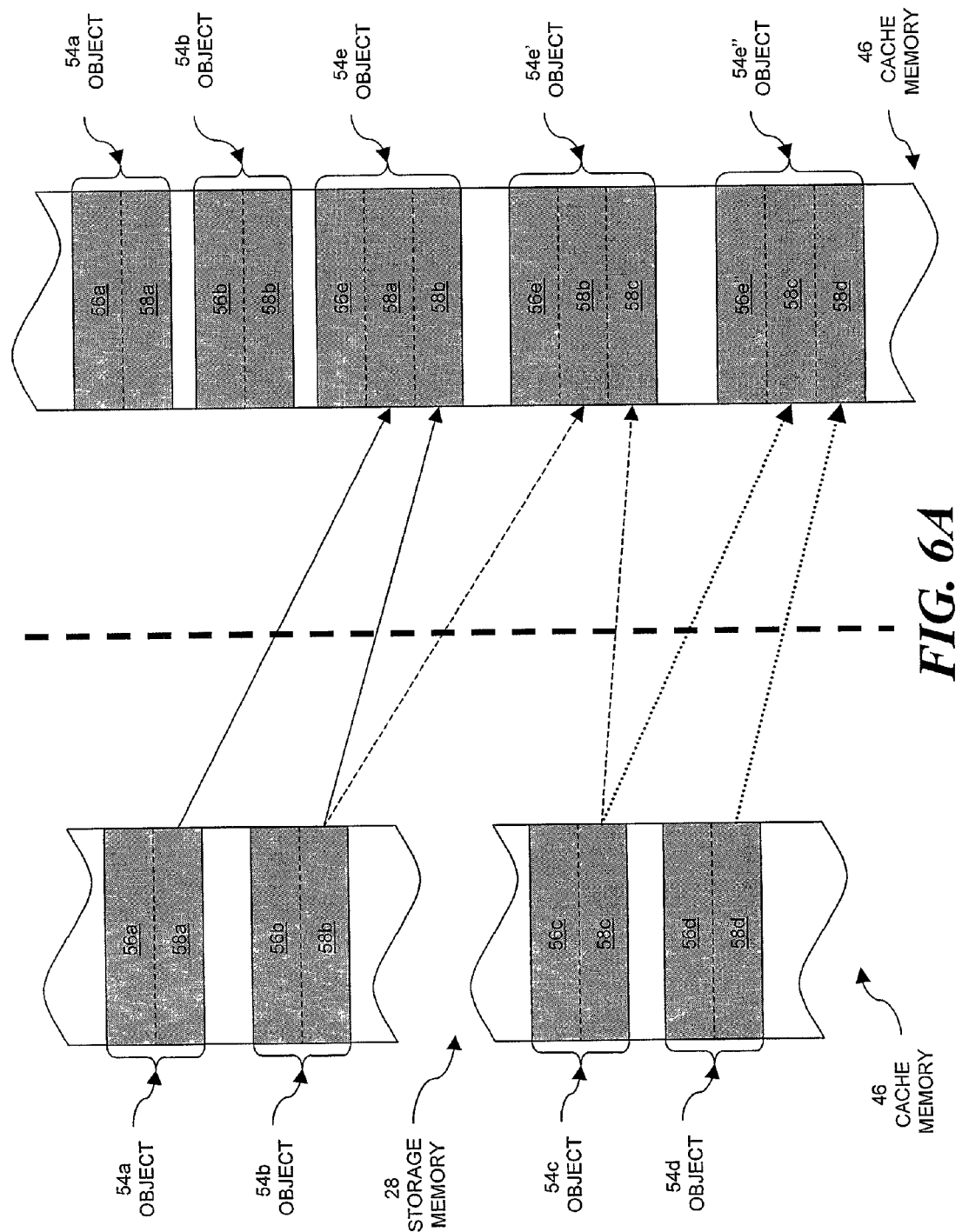

CACHE SYSTEM AND METHOD FOR GENERATING UNCACHED OBJECTS FROM CACHED AND STORED OBJECT COMPONENTS

RELATED APPLICATION

This application claims the benefit of the filing date of U.S. Provisional Application, Ser. No. 60/225,412, filed Aug. 15, 2000, now abandoned, entitled "Object Generating Smart Caching System," the entirety of which provisional application is incorporated by reference herein.

FIELD OF THE INVENTION

The invention generally relates to data processing storage architectures and processes, and more specifically relates to cache memory for efficient access to stored data.

BACKGROUND OF THE INVENTION

Recent developments in the computer and computer networking industries have spawned an ever increasing demand for fast access to large amounts of data relating to objects such as images, audio, and documents. Dramatic increases in both data storage capacity and computer processing speed have allowed computer applications to process and store greater amounts of data facilitating data content rich with multi-media. Similar advances in computer networking have lead to dramatic increases in both communications bandwidth and the breadth of network access. With these advances, vast amounts of information are routinely shared among computers supporting web-based and other networked applications.

Typically, a host computer is connected to a storage device, such as a hard disk drive or a file server, having a memory that holds the information in the form of objects. When the host computer receives a request for a data object, the storage device is queried and the object is retrieved from the storage device and transferred to the host computer. To reduce a delay involved in accessing the object from the storage device, a cache is often used on the host computer. The cache typically includes a smaller memory used to store the most frequently requested objects from the storage device. The cached objects are more quickly accessible than objects stored within the larger storage device. Therefore, subsequent requests for objects that have been cached can be responded to quickly directly from the cache, without the need to access the storage device.

A typical cache includes binary logic functioning when the cache receives a request for an object to determine if the object is available in the cache. If the object is available in the cache, the cached object is used to respond to the request. If the object is not available in the cache, the object request is responded to by retrieving the object from the larger storage device. If the storage device is connected to the requesting processor through a shared communications bus, there will likely be delays to retrieve the object due to the bandwidth of the bus, competition from other devices connected to the bus, and additional instructions necessary to communicate the object request to the storage device and the object delivery to the requestor. This delay will likely be even greater if the storage device, such as a web server, is remotely located and connected by a communication link such as the World Wide Web.

SUMMARY OF THE INVENTION

The present invention relates to a cache system and method for generating uncached objects from cached and stored object components. One embodiment of the invention caches image files, where the images consist of components and are stored in a format that allows identification and access to the individual image components.

In one aspect, a regenerative cache system determines that an object, such as an image file, is missing from the cache memory. The regenerative cache system then locates sufficient components to construct the object, where the components can be located within the cache memory, or within an external storage device. Once the components are located, the regenerative cache system constructs the object.

One feature of the invention in one embodiment is the storing within the regenerative cache system objects constructed by the regenerative cache system in response to an object request where the object is initially missing from the cache.

Another feature of the invention in one embodiment is the requesting of an object by the regenerative cache system in anticipation of an external request for an object not initially stored within the cache. Here, the regenerative cache system determines that an object will likely be requested, then the regenerative cache system determines if the object is missing. If the anticipated requested object is missing from the cache, the regenerative cache system constructs the object.

In another aspect, a regenerative cache system includes an interface, logic element, memory, and a processor. The interface allows the regenerative cache system to communicate with external devices or systems to monitor requests for objects, to access externally stored objects and components, and to respond to requested objects. The logic element functions to determine if a requested object is missing from the cache, then, if missing, to locate the components to construct the requested object. Memory stores objects that are likely to be requested and objects that include components that are likely to be necessary to construct requested objects that are not themselves in the cache. The processor functions in coordination with the interface, the logic element, and the memory to access the necessary components and construct the requested object.

One feature of the invention responds to a requested JPEG 2000 image file that is initially missing from the cache by constructing the requested image file using components from one or more JPEG 2000 image files resident within the cache system memory, or resident within external storage systems.

Another feature of the invention is to respond to a requested document file that is initially missing from the cache by constructing the requested document file by using components of other document files resident within the cache system memory, or resident within external storage systems.

Yet another feature of the invention is to respond to a requested web-page file that is initially missing from the cache by constructing the requested web-page file by using components of other web-page files resident within the cache system memory, or resident within external storage systems.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention may be better understood by referring to the following description taken in conjunction with the accompanying drawings in which:

DETAILED DESCRIPTION OF THE INVENTION

Figure 1:
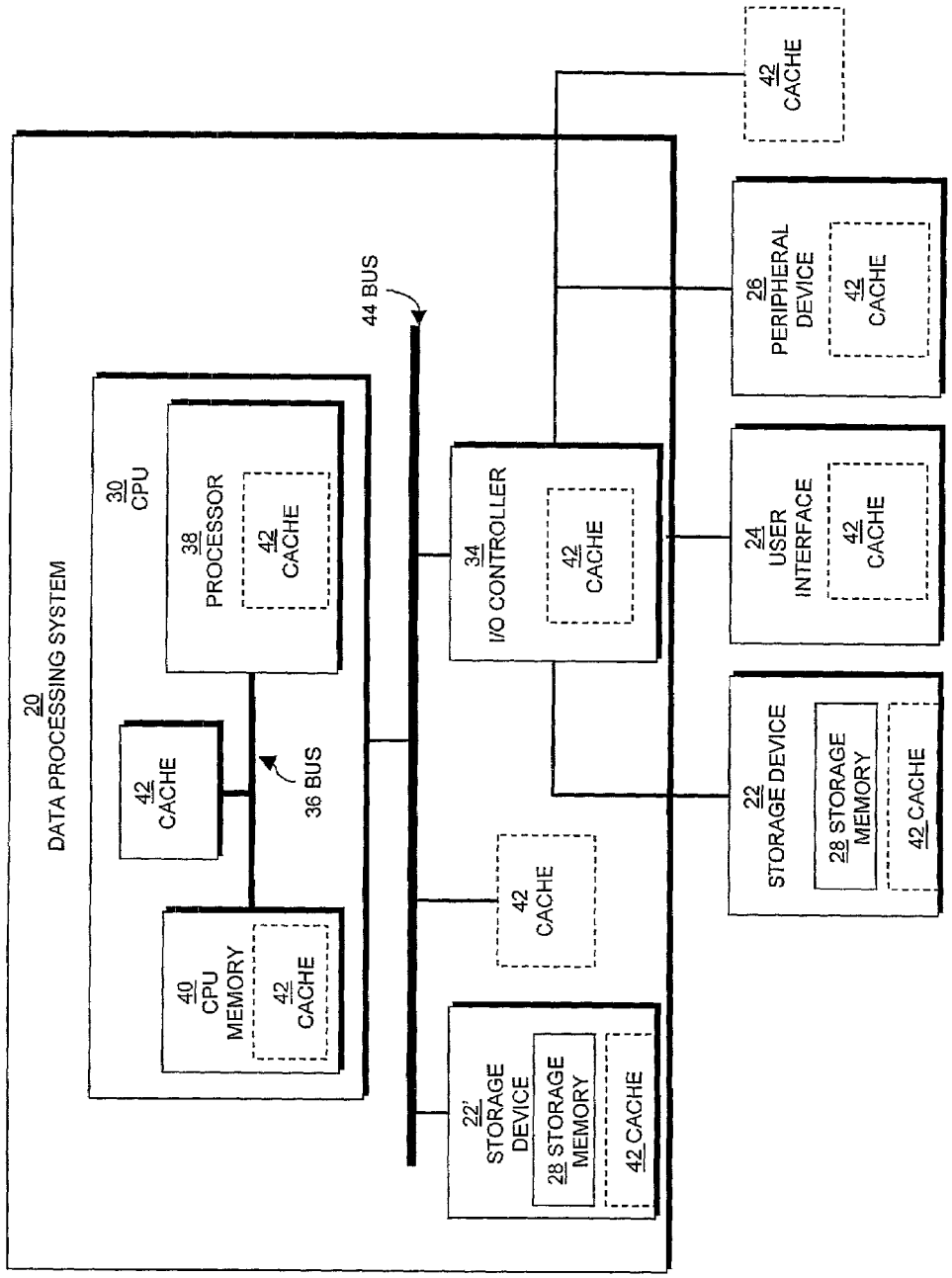
FIG. 1 is a block diagram of an embodiment of a data processor architecture showing the relationship between a cache and a host data processor in this embodiment.

Referring to FIG. 1, in one embodiment a data processing system 20 is in communication with a first storage device 22, a user interface 24, and one or more peripheral devices 26. The data processing system 20 receives data through either the user interface 24, the peripheral device 26, such as a modem or image scanner, or through memory reads from the first storage device 22 where the storage device comprises storage memory 28. The first storage device 22 can be any data storage device such as a disk drive, a magnetic tape drive, an optical disk drive, or an electronic memory. The data processing system 20 processes and optionally delivers data to the user interface 24, such as a terminal display, to the peripheral device 26, such as a printer, or through memory writes to the storage memory 28 of the first storage device 22.

The data processing system 20 includes a central processing unit (CPU) 30 in communication with a second storage device 22' and an input/output (I/O) controller 34 through an electrical communications bus 44. The second storage device 22' is similar to the first storage device 22, having a storage memory 28, except that the second storage device 22' constitutes part of the data processing system 20 and is addressable directly through the system bus 44. The I/O controller 34 interfaces the first storage device 22, the user interface 24, and one or more peripheral devices 26 to the CPU 30. The CPU 30 receives, processes, and delivers data.

The CPU 30 is further comprised of a processor 38, a CPU memory 40, and a regenerative cache system 42. The CPU 30 is in electrical communication with the CPU memory 40 and the regenerative cache system 42 through a CPU electrical communications bus 36. In one embodiment the CPU 30 is a computer, such as a file server, workstation, or personal computer (PC), and the memory 40 comprises any combination of dynamic random access memory (DRAM), read only memory (ROM), registers and cache used to store the instructions and data processed by the processor 38.

Other embodiments are shown with the regenerative cache system 42, shown in phantom, where the regenerative cache system 42 is configured locally at one or more of each of the CPU memory 40, the processor 38, the first and second storage devices 22 and 22', the I/O controller 34, the user interface 24, and the one or more peripheral devices 26. Also shown are embodiments wherein the regenerative cache system 42, shown in phantom, is configured as one or more standalone system components, and wherein the regenerative cache systems 42 are in communication with the CPU 30 through the I/O controller 34 and through the system bus 44. The regenerative cache system 42 caches objects and generates uncached objects from cached and stored objects in accordance with the principles of the invention.

Figure 2:
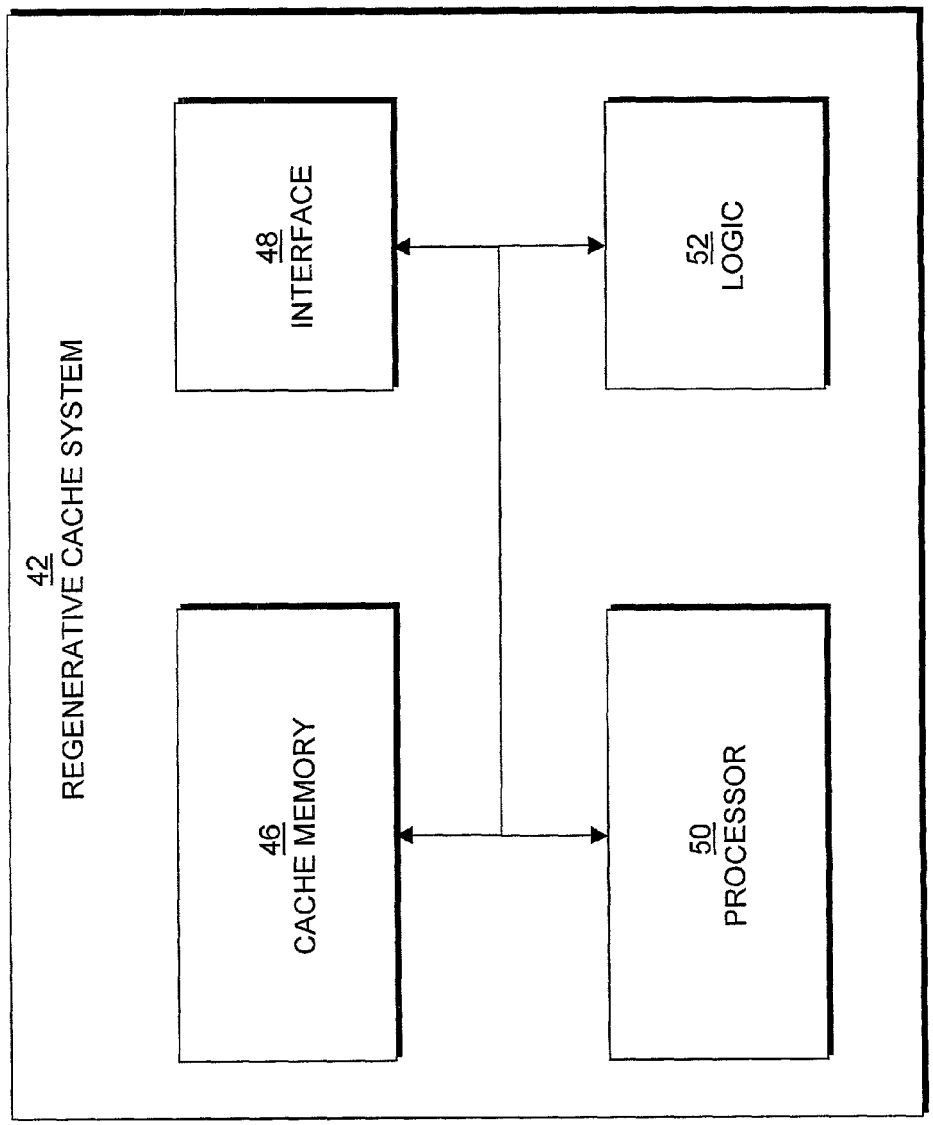
FIG. 2 is a general block diagram illustrating an embodiment of an implementation of the cache.

Referring to FIG. 2, one embodiment of the regenerative cache system 42 includes a cache memory element 46, an interface element 48, a processor element 50, and a logic element 52. The memory element 46 is in electrical communication with the interface element 48, the processor element 50, and the logic element 52.

In one embodiment, the regenerative cache system 42 manipulates and stores objects. In this embodiment, the cache memory element 46 provides a storage capability enabling the regenerative cache system 42 to store objects locally to the regenerative cache system 42. The interface element 48 is in further communication with external systems, devices, or components enabling the regenerative cache system 42 to accept as input new objects for storage or processing and to provide as output cached objects and/or components of cached objects. The logic element 52 enables the regenerative cache system 42 to locate an object. In one embodiment, the logic element 52 determines whether an object is available within the cache memory element 46 and/or whether an object is available externally to the regenerative cache system 42 where the object can be located within one or more of each of the CPU memory 40, the first and second storage devices 22, 22', a second regenerative cache system 42 the user interface 24, and one or more peripheral devices 26.

In one embodiment, in addition to locating objects within and without the regenerative cache system 42, the logic element 52 performs functions similar to a typical cache related to managing the limited cache memory 46 in an efficient manner (e.g., maintaining cached items determined likely to be requested in the future and not maintaining cached items determined not likely to be requested in the future).

Objects stored within the memory element 46 are individually addressable and can be addressed directly by memory location address, indirectly by a reference, such as a filename, or referentially through a virtual address map or address look-up table.

The elements 46, 48, 50, 52 of the regenerative cache system 42 can be grouped together and located on a single substrate, within a single module, or within a single chassis, distributed among combinations of one or more substrates, modules, or chassis, or shared among multiple regenerative cache systems 42. In one illustrative example of one embodiment of a shared element regenerative cache system 42 configuration, the processor 50 of a first regenerative cache system 42 serves as the processor 50 of a second regenerative cache systems 42.

Figure 3:
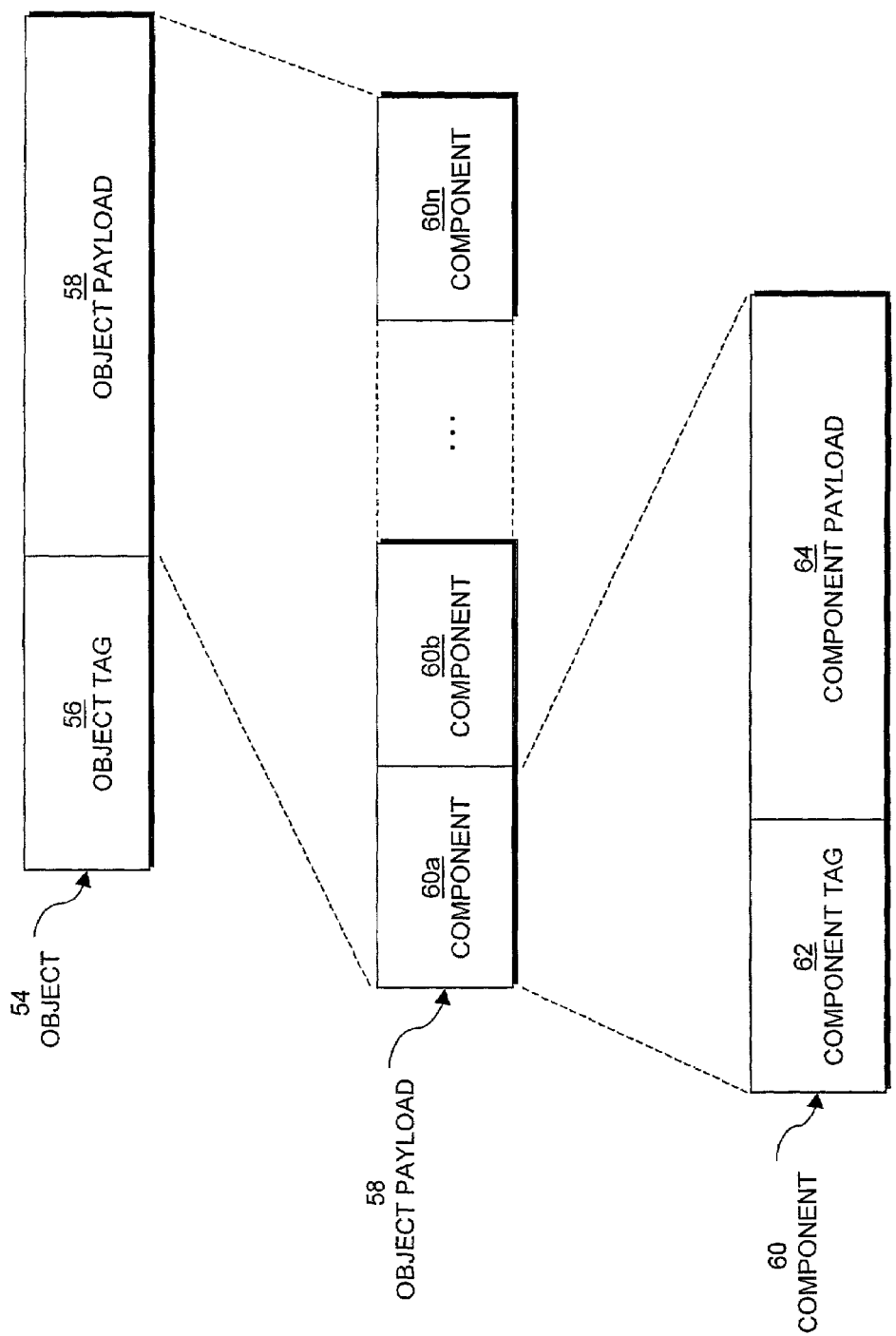
FIG. 3 is a general diagram illustrating an example of a data object structure.

Referring to FIG. 3, an object 54 contains an object tag 56 providing information related to the object 54 and an object payload 58 containing additional information related to the object 54. The object 54 represents any file having a format describing structured data. Examples of files having structured data formats include extensible markup language (XML) files; files using the Object Linking and Embedding (OLE) structure; image files, such as bitmap, including OS/2 bitmap files containing multiple images, Computer Graphics Metafile (CGM), Flexible Image Transport System (FITS) file, Graphics Interchange Format (GIF) file, Hierarchical Data File (HDF), Adobe PostScript file, Tagged-Image File Format (TIFF), compressed image files, such as discrete-cosine transformed image files and wavelet-transformed image files, such as Joint Photographic Experts Group (JPEG) compressed image files, including JPEG 2000 files; audio files such as MP3 files, or Wave Form Audio File Format files; compressed files, such as "zipped" files; video files, such as Moving Picture Experts Group (MPEG) files; and database files. The object tag 56 contains information such as "meta" data, identifying a particular object 54 by including information such as a file identifier, a file type, and details relating to the particular file construction.

The object payload 58 is comprised of one or more components 60a through 60n (generally 60). Each component 60 is comprised of a component tag 62 and a component payload 64. The component tag 62 provides information such as a component identifier, a component type, and details relating to the component contents. The component payload 64 contains additional information related to the component 60. In some embodiments, the components 60 can be further subdivided into sub-component levels with a structure similar to that described for the component 60.

With these objects 54 representing structured data storage objects 54, such as XML, OLE, or JPEG 2000, the regenerative cache system 42 has the ability to search for and manipulate components 60. Once the components 60 have been located, they can be accessed and manipulated in a variety of ways for further processing and viewing. The objects 54 also lend themselves to being granularly updated by adding, subtracting, or re-ordering the individual object components 60.

In one embodiment each of the components 60 of an object 54 can constitute a new object 54 either individually or in combination. The components 60 can also be components 60 of objects 54 available within the cache memory 46, which, when extracted from their objects 54 and combined and affixed with an appropriate object tag 56, yield new objects 54.

Figure 4:
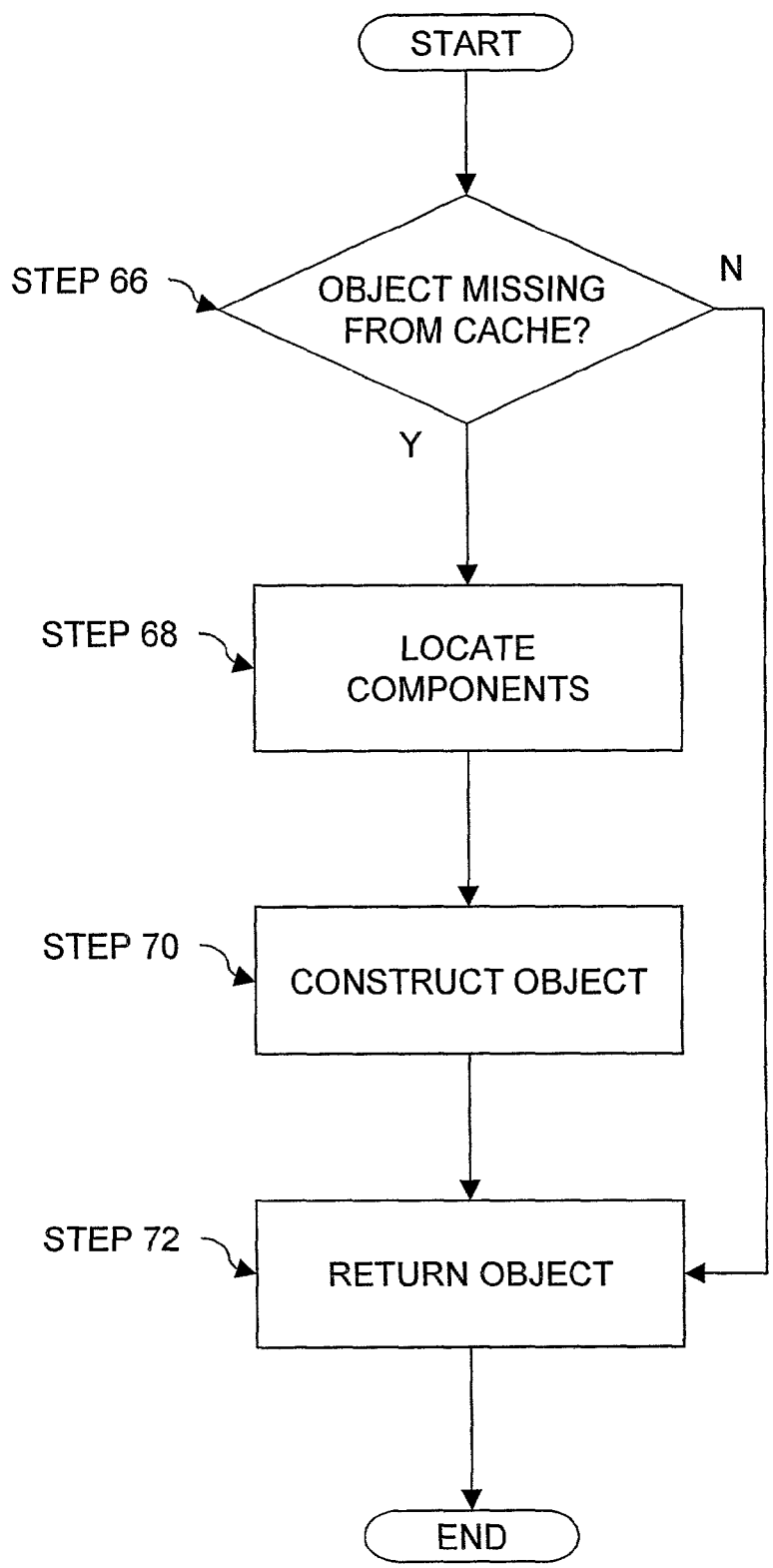
FIG. 4 is a flow diagram generally illustrating an embodiment of a process for constructing objects in the cache.

FIG. 4 shows an embodiment of a process used by the regenerative cache system 42 to construct an object 54. The regenerative cache system 42 determines if an object 54 is missing from the cache memory 46 (step 66). The object 54 can be identified by an external request or from the regenerative cache system 42 determining that the object be obtained and cached in anticipation of a future request. The requested object 54 is missing from the cache 42 if the requested object 54 has not been previously stored and maintained within the cache memory 46. If the object 54 is not missing from the regenerative cache system 42, the regenerative cache system 42 returns the requested object 54 stored within the cache memory 46 to respond to the requestor (e.g., the processor 38). If the requested object 54 is missing from the cache memory 46, the regenerative cache system 42 locates one or more components 60 sufficient to construct the requested object 54 (step 68) and constructs the object 54 (step 70) and returns the requested object 54 (step 72) to respond to the object 54 request. The regenerative cache system logic element 52 knows the contents of its own cache memory 46 and the requested object 54 because the regenerative cache system 42 accepts requests for objects 54. In one embodiment the regenerative cache system 42 determines the contents of its own cache memory 46 through the method used to track cached objects 54, such as a file table, directory, or address map. The logic element 52 determines the components 60 from which the object 54 can be produced and determines if those components 60 are available within the cache memory 46. In one embodiment, the logic element 52 determines the components 60 from which the object 54 can be produced from the syntax of the file structure and the request for the object 54. The syntax of the file structure defines structural attributes of the objects 54 and can include the definition of structural details relating to the object tag 56 and the one or more component tags 62 of the requested object 54. The request for the object 54 identifies what the requested object 54 is. An example of a request for a JPEG 2000 image object 54 identifies the source image (e.g., a computer file relating to a particular photograph) and how the requested object 54 is structured (e.g., in increasing resolution where lower-resolution components 60 are ordered before higher-resolution components). In some embodiments, the requested object 54 can be retrieved directly from the one or more remote storage devices 22, 22', 40, 42 regardless of the presence within the cache memory 46 of components 60 from which the object 54 can be produced. The requested object 54 can be retrieved directly from the one or more remote storage devices 22, 22', 40, 42 under any one of several situations, such as if ample communications bandwidth is available or if the pre-request contents of cache memory 46 are to be preserved.

In one embodiment, the objects 54 are JPEG 2000 image files and the logic element 52 examines the object tags 56 of the objects 54 stored in the cache memory 46 to determine if the object 54 is missing from the cache memory 46. If the object 54 is missing from the cache memory 46, the regenerative cache system 42 examines the object 54 and component tags 62 of each object 54 available within the cache memory 46 to determine if any or all components 60 are available within the cache memory 46 to respond to the requested object 54. If sufficient components 60 are available, the components 60 are combined accordingly to construct an object 54 to respond to the object 54 request. If some components 60 are available within the cache memory 46, but not all components 60 sufficient to construct the requested object 54, the regenerative cache system 42 obtains locally those components 60 available within the cache memory 46 and then obtains the additional components 60 sufficient to construct the requested object 54 from the one or more remote storage devices 22, 22', 40, 42. The regenerative cache system 42 then combines the components 60 to construct the requested object 54. In some embodiments, the requested objects 54 are retrieved from storage directly rather than constructed within the regenerative cache system 42, even though some, or sufficient components 60 may be available in cache memory 46.

In one embodiment, after having constructed the requested object 54, the regenerative cache system 42 stores the newly constructed object 54 to satisfy future requests. In some embodiments, the components 60 used to construct the object 54 are copied and maintained separately as components 60 within the cache memory 46. In other embodiments, the components 60 are used and combined to form the requested object 54 and the original components 60 are no longer stored. This form of object generation can be used where it is more efficient to store the components 60 within the constructed object 54, or if the regenerative cache system 42 has determined that the components 60 within cache memory 46 are no longer necessary.

Figure 5:
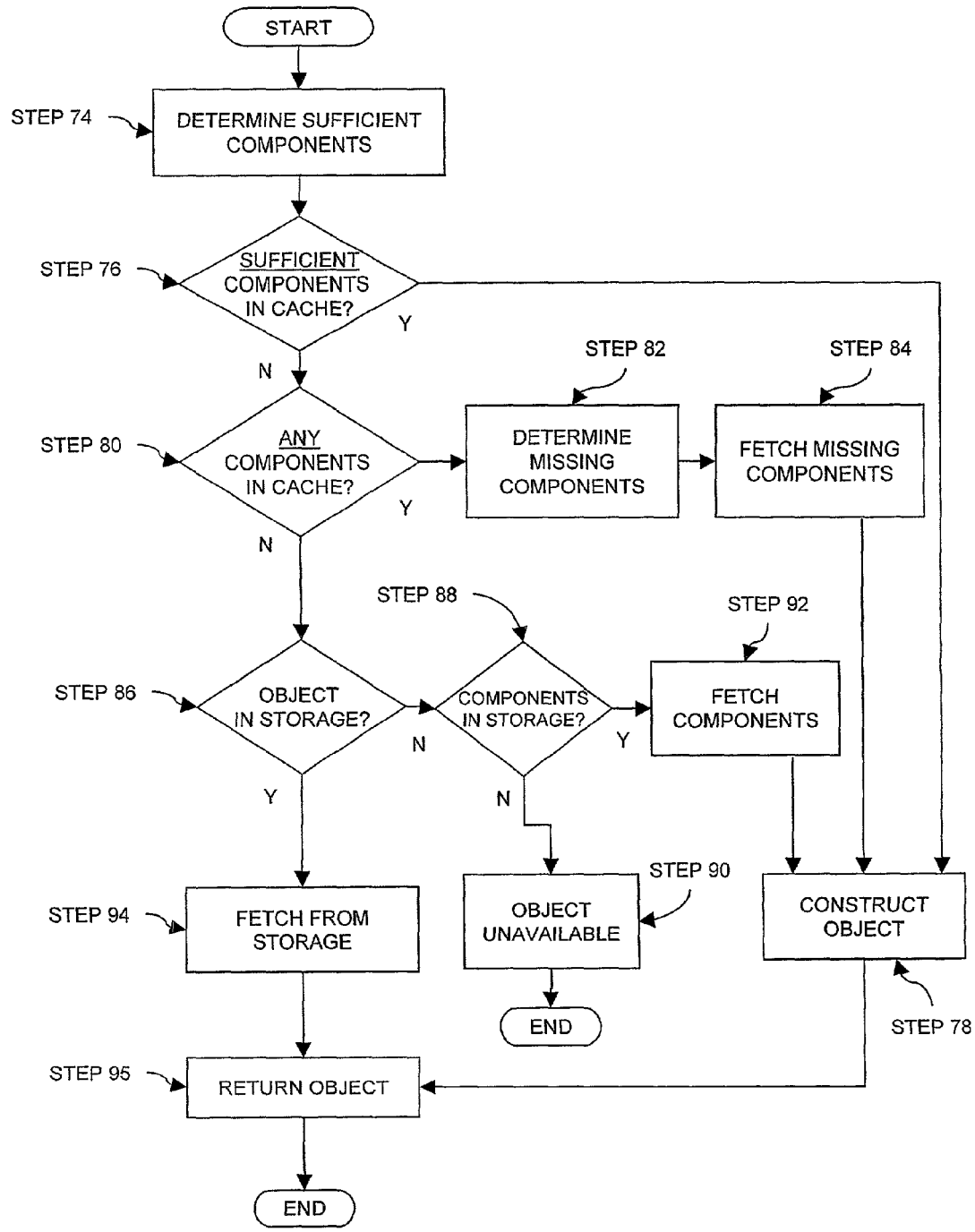
FIG. 5 is a more detailed flow diagram illustrating an embodiment of a process for constructing objects in the cache.

In more detail, referring to FIG. 5, one embodiment of the regenerative cache system 42 determines the one or more components 60 sufficient to construct the requested object 54 (step 74). The regenerative cache system 42 determines the sufficient components 60 from the syntax of the file structure and the request for the object 54. The regenerative cache system 42 determines if the sufficient components 60 to construct the requested object 54 are available within the cache memory 46 (step 76). If the sufficient components 60 are available within the cache memory 46, the object 54 is constructed by the cache processor 50 (step 78). If the components 60 are not available in the cache memory 46, the regenerative cache system 42 determines if any components 60 of the requested object 54 are available in the cache memory 46 (step 80). If any of the components 60 of the requested object 54 are available in the cache memory 46, the regenerative cache system 42 determines which components 60 are missing by comparing the determined components 60 of the requested object 54 available in the cache memory 46 to the determined components 60 sufficient to construct the requested object 54 (step 82). Having determined the missing components 60, the regenerative cache system 42 retrieves the missing components 60 from one or more remote storage devices 22, 22', 40, 42 (step 84). Referring again to FIG. 1, the one or more remote storage devices 22, 22', 40, 42 can include local memory 40, a local storage device 22 in communication with the CPU 30 through a system bus 44, a peripheral storage device 22, an external storage source in communication with the data processing system 20, or another regenerative cache system 42. The regenerative cache system 42, having the components 60 from the locally available cache memory 46 and those retrieved from the remote one or more storage devices 22, 22', 40, 42, constructs the requested object 54 (step 78). The object 54 can be returned in response to an object request (step 95) and/or cached for future requests.

If no components 60 of the requested object 54 are available in the cache memory 46 (step 80), the regenerative cache system 42 determines if the requested object 54 is externally available in one or more of the remote storage devices 22, 22', 40, 42 (step 86). In one embodiment, if the object 54 is available in storage memory 28 of either of the remote storage devices 22, 22', the regenerative cache system 42 need not respond to the request because either of the storage devices 22, 22' replies to the request directly. Alternatively, the regenerative cache system 42 can retrieve the requested object 54 from the one or more remote storage devices 22, 22', 40, 42 and store it in the cache memory 46 to respond to future requested objects 54.

If the object 54 is not available in the one or more remote storage devices 22, 22', 40, 42 (step 86), having already determined that no components 60 are available within the cache memory 46 (step 80), the regenerative cache system 42 determines if the necessary components 60 that can produce the requested object 54 are externally available in the one or more remote storage devices 22, 22', 40, 42 (step 88). If the components 60 that can produce the requested object 54 are unavailable in the one or more remote storage devices 22, 22', 40, 42 the object request cannot be satisfied (step 90). If the components 60 are available in the one or more remote storage devices 22, 22', 40, 42, the regenerative cache system 42 retrieves the necessary components 60 (step 92) and constructs the requested object 54 (step 78). Again, in some embodiments, the requested object 54 can be retrieved directly from the one or more remote storage devices 22, 22', 40, 42 regardless of the presence or absence within the cache memory 46 of any components 60 from which the object 54 can be produced.

In one embodiment, the regenerative cache system 42 stores within the cache memory 46 the components 60 retrieved externally from the one or more remote storage devices 22, 22', 40, 42. In another embodiment, the regenerative cache system 42 stores within the cache memory 46 the object 54 constructed by the regenerative cache system 42.

FIG. 6A shows three examples of the regenerative cache system 42 constructing objects 54 in accordance with the principles of the invention. This figure illustrates the cache memory 46 and the storage memory 28, where each of the cache memory 46 and the storage memory 28 contain data in the form of objects 54a, 54b, 54c, and 54d. The cache memory 46 is illustrated twice, first on the left-hand side of the figure and again on the right-hand side of the figure. The left-hand side of the figure represents the contents of cache memory 46 and storage memory 28 before the regenerative cache system 42 receives a request for a particular object 54e. The cache memory 46 on the right-hand side of the figure represents the same cache memory 46 with altered memory contents after the regenerative cache system 42 responds to the request for the particular object 54e and cached the requested object 54.

For each of these examples, the cache memory 46 initially contains object 54a and object 54b and the storage memory 28 contains objects 54c and 54d. In a first example, the particular object 54e is requested and the regenerative cache system 42 determines that the particular object 54e is missing from the cache memory 46 as shown by the left-hand side of the figure. The regenerative cache system 42 determines the components 60 that can produce the requested particular object 54e. The logic element 52 then determines that the components 60 that can produce the requested particular object 54e are resident within the cache memory 46 and are contained within object payloads 58a and 58b of objects 54a and 54b, respectively. In this example, the particular components are not shown because the components 60 that make up each of the object payloads 58a and 58b are used to construct the requested particular object 54e. The regenerative cache system 42 then constructs the particular object 54e by taking the components 60 contained within the object payloads 58a and 58b, combining them, and affixing the object tag 56 for requested particular object 54e. The solid arrows from the left-hand side of the figure to the right trace the results of the regenerative cache system 42 responding to the request for requested particular object 54e. Although the constructed object 54 is shown as the concatenation of objects 54a and 54b, the resulting particular object 54e is itself a new and distinct object. As shown in this example, objects 54a and 54b remain within the cache memory 46 after the construction of a particular object 54e.

In a second illustrative example shown by the dashed arrows, a particular object 54e' is requested and found missing from the cache memory 46. The regenerative cache system 42 determines the components 60 that can produce the particular object 54e' and the logic element 52 locates some, but not all of the sufficient components 60 within the cache memory 46. In this example, the components 60 located within cache memory 46 make up the object payload 58b of object 54b. To construct the requested particular object 54e', the logic element 52 locates missing components 60 in storage memory 28 where the missing components 60 are contained within the object payload 58c of object 54c. Having the cached components 60 from object 54b the regenerative cache system 42 obtains the missing components located in the storage memory 28 and constructs the requested particular object 54e' in a manner similar to the construction of particular object 54e constructed in previous illustrative example.

In yet another illustrative example also referring to FIG. 6A and shown by the dotted arrows, a particular object 54e" is requested and found missing from the cache memory 46. The regenerative cache system 42 determines the components 60 that can produce the requested particular object 54e" and the logic element 52 determines that none of the components 60 are available within the cache memory 46. The regenerative cache memory 42 determines that the requested object 54e" is not available in storage memory 28 and the logic element 52 locates the components 60 within object payloads 58c and 58d of objects 54c and 54d, respectively. The regenerative cache memory 42 then obtains the missing components 60 from storage memory 28 and then constructs the requested particular object 54e" in a manner similar to that described within the first and second illustrative examples.

Figure 6B:
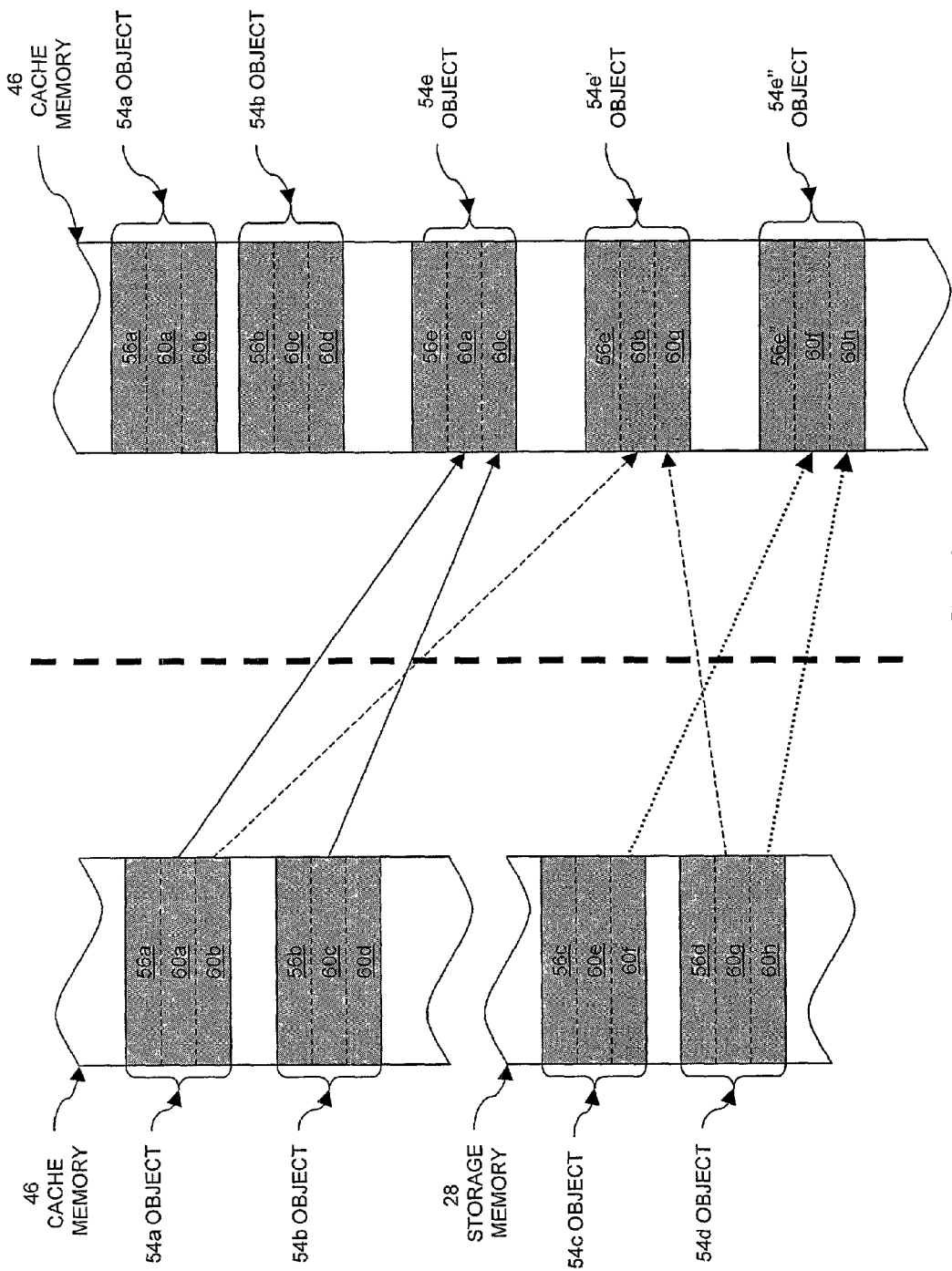
FIG. 6 is a general diagram illustrating an example of data object construction.

FIG. 6B shows three examples of the regenerative cache system 42 constructing objects 54 in accordance with the principles of the invention. FIG. 6B illustrates a configuration of cache memory 46 and storage memory 28 similar to that illustrated in FIG. 6A with further detail regarding the components of the stored objects 54. In each of these three illustrative examples, each of the objects 54 stored in cache memory 46 and storage memory 28 are shown comprising multiple components 60. Similar to the illustrative examples of FIG. 6A, the requested particular objects 54e, 54e', and 54e" are comprised of one or more components 60 of a first stored object 54a, 54c in combination with one or more components 60 of a second stored object 54b, 54d.

For each of the illustrative examples relating to FIG. 6B, object 54a and object 54b are initially stored within the cache memory 46 and objects 54c and 54d are initially stored within the storage memory 28. The regenerative cache system 42 determines which components 60 of stored objects 54 are necessary to construct the requested particular requested object 54e, 54e', or 54e". The logic element 52 locates the components 60 to construct the requested particular object 54e, 54e', or 54e" and the regenerative cache system 42 constructs the requested particular object 54e, 54e', or 54e".

In the first illustrative example, the requested particular object 54e is comprised of components 60a and 60c. The logic element 52 locates component 60a within object 54a stored in cache memory 46. The logic element 52 also locates component 60c within object 54b, also stored within cache memory 46. The regenerative cache system 42 extracts components 60a and 60c from objects 54a and 54b, respectively, and constructs the requested particular object 54e by combining objects 60a and 60c and affixing a new object tag 56 associated with the requested particular object 54e. The solid arrows extending from the components 60a and 60c stored within objects 54a and 54b, respectively, within the cache memory 46 to the particular object 54e generated in response to the request illustrate the relationships between the objects 54 and components 60 relating to the request of this illustrative example. In this example, the particular object 54e constructed in response to a request is shown stored within the cache memory 46.

In a second illustrative example shown by the dashed arrows, a requested particular object 54e' is constructed by the regenerative cache system 42 similarly to the construction of the requested particular object 54e of the previous example, from component 60b of object 54a stored within cache memory 46 and from component 60g of object 54d stored within storage memory 28.

In a third illustrative example shown by the dotted arrows, a requested particular object 54e" is constructed by the regenerative cache system 42 similarly to the construction of requested particular objects 54e and 54e' in the preceding two illustrative examples from component 60f of object 54c stored within the storage memory 28 and component 60h of object 54d, also stored within the storage memory 28.

Figure 6C:
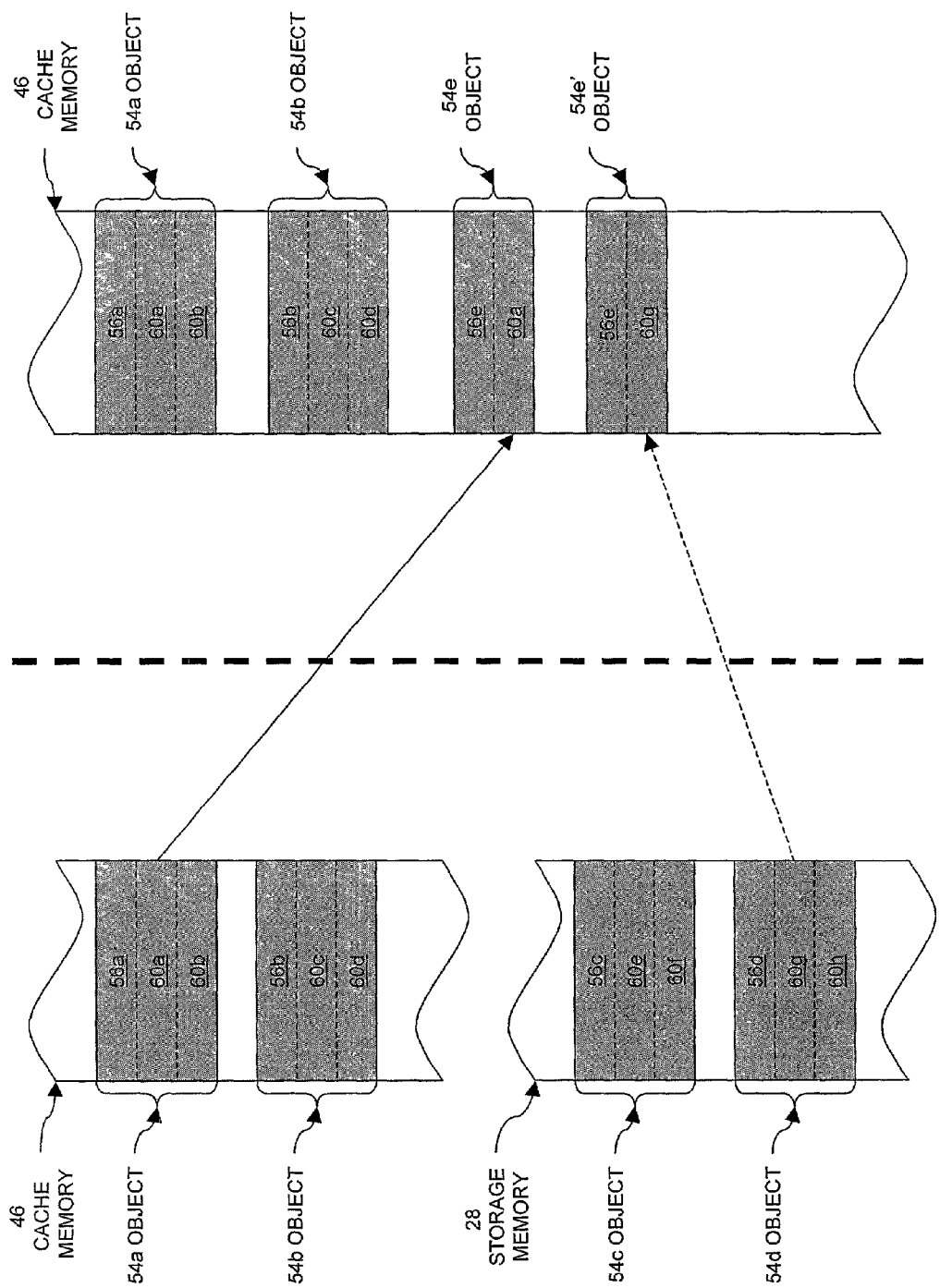

FIG. 6C shows further illustrative examples of the regenerative cache system 42 constructing objects 54 in accordance with the principles of the invention where the requested particular object 54 is comprised of one or more components of a single object. In the first illustrative example, the particular object 54e is requested where the components of object 54e are comprised of component 60a. The logic element 52 locates component 60a as a component 60 of object 54a stored in cache memory 46. The regenerative cache system 42 extracts component 60a from object 54a, affixes the object tag 56 to the particular object 54e, and stores the particular object 54e in response to the request for the particular object 54e. The solid arrow extending from object 60a stored within object 54a within the cache memory 46 to the particular object 54e generated in response to the request illustrates the relationships between the objects 54 and components 60 relating to the request of this illustrative example.

Similarly, in a second illustrative example, a particular object 54e' is requested where the components of object 54e' are comprised of component 60g. The logic element 52 locates component 60g as a component 60 of object 54d stored in storage memory 28. The regenerative cache system 42 extracts component 60g from object 54d, affixes the object tag 56 to the particular object 54e', and stores the particular object 54e' within the cache memory 46 in response to the request for the particular object 54e'. The dashed arrow extending from object 60g stored within object 54d within the cache memory 46 to the particular object 54e' generated in response to the request illustrates the relationships between the objects 54 and components 60 relating to the request of this second illustrative example.

Figure 7:
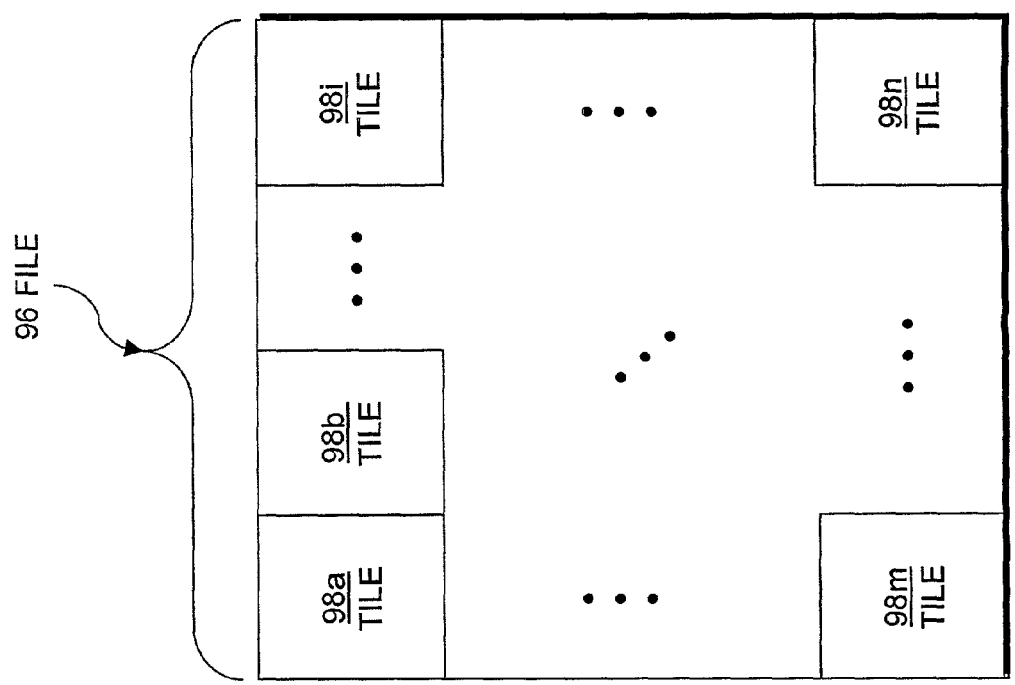
FIG. 7 is a general diagram illustrating an example of an image data object.

Referring to FIG. 7, in an illustrative example of one embodiment of a regenerative cache system 42, a requested object 54 is a graphical image file 96, where the image file is a computer-readable representation of a graphical image, such as a digitized representation of a photograph. The image file can be an uncompressed image file such as a bitmapped image file, or a compressed image file, such as a discrete-cosine-transformed image file, or a wavelet-transformed image file. The image file 96 is comprised of a plurality of tiles 98a to 98n (generally 98). One example of an image file 96 is a geographical map, such as a road, terrain, or weather map, where the image comprises a large number of pixels, more than typically displayable on a standard computer display terminal. The exemplary image file 96 can be treated as a whole or subdivided into tiles 98 where the tiles correspond to a subset of the image file pixels that are capable of being simultaneously displayed on a computer display terminal. Here, the entire image file 96 can be requested from the one or more remote storage devices 22, 22', 40, 42 and the individual tiles 98 displayed as required, or individual tiles 98 can be retrieved from the one or more remote storage devices 22, 22', 40, 42 as required. If the requestor of the image file 96 observes a first tile 98a, then observes a second tile 98b, the regenerative cache system 42 can store the requested tiles 98a and 98b in the cache memory 46. A later request for a different object 54 including either of the tiles 98a or 98b as components 60 can be served from cache memory 46 using the cached tiles 98a or 98b rather than retrieving the tiles 98a, 98b from the one or more remote storage devices 22, 22', 40, 42.

Figure 8:
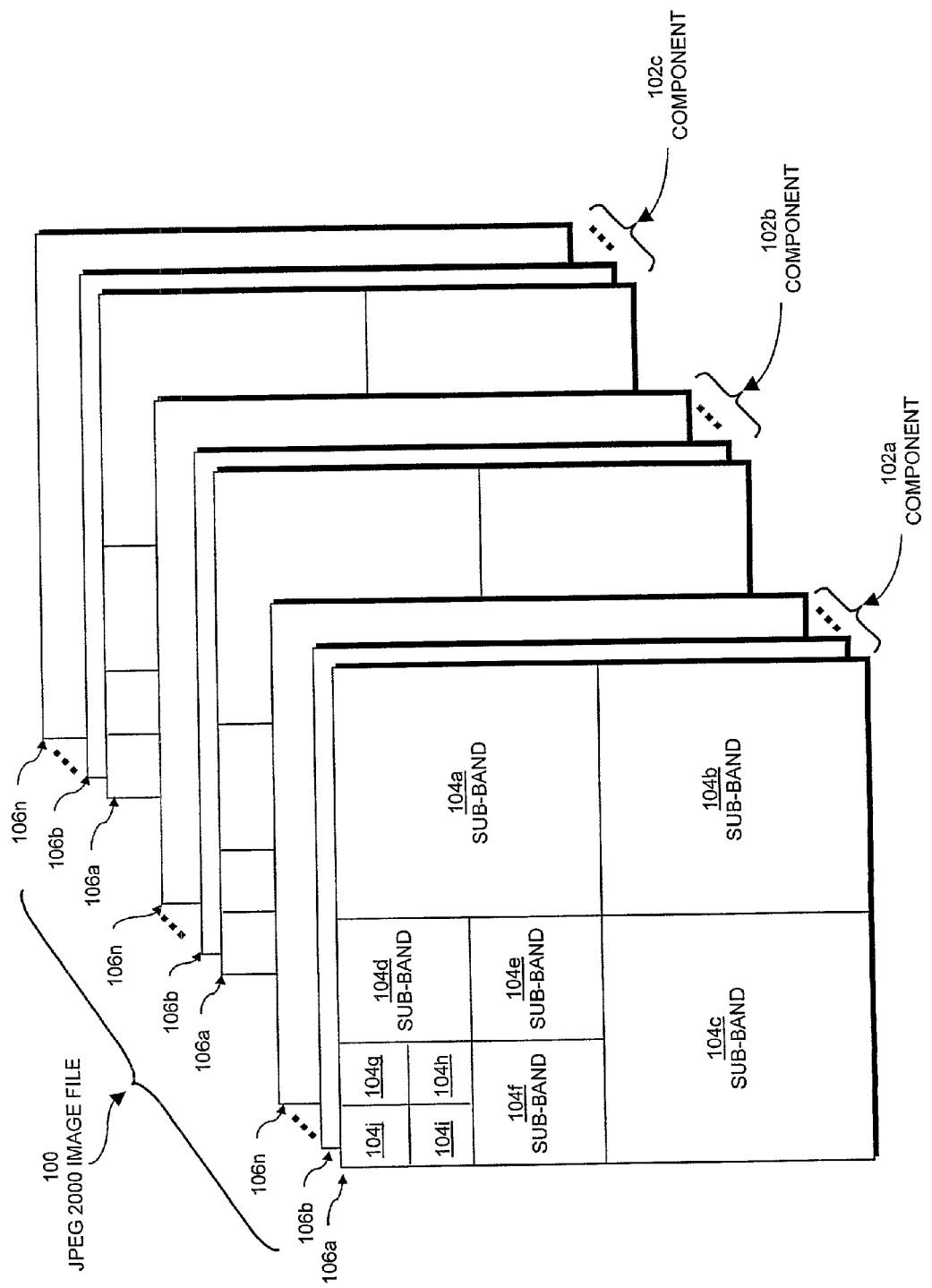
FIG. 8 is a general diagram illustrating an example of another image data object.

Referring to FIG. 8, in one embodiment the object 54 is a wavelet-transformed, compressed image 100. One example of a wavelet-transformed, compressed image 100 is a JPEG 2000 image 100. The JPEG 2000 image 100 is comprised of various categories of components 60 related to the nature in which the JPEG 2000 compression algorithm functions. The JPEG 2000 compression algorithm takes a digital representation of an image 96 as shown in FIG. 7 and divides the image into one or more tiles 98. The JPEG 2000 compression algorithm is applied separately to each of the tiles 98. Each tile 98 is divided into components 102a, 102b, and 102c (generally 102) such as red, green, and blue color components 102 that when combined together yield a color image. Each of the color components 102 is transformed using a wavelet transform to form sub-bands 104a through 104j (generally 104) of the original image file 96. Sub-bands 104a, 104b, and 104c correspond to a first level wavelet transform. Sub-bands 104d, 104e, and 104f correspond to a second sub-band level, and sub-bands 104g, 104h, and 104i correspond to a third sub-band level. The transform can be applied repeatedly to produce additional levels of sub-bands 104. The various levels of sub-bands 104 correspond to different levels of image resolution.

When applying the JPEG 2000 algorithm to an image file 96, the two dimensional arrays of sub-bands 104 for each color component 102 are further divided by the JPEG 2000 algorithm into layers, or collections of coded bit-planes, 106a through 106n (generally 106). These layers 106 correspond to levels of image quality or accuracy. The more layers 106 that are decoded, the higher the quality of the image that is presented.

Referring again to FIG. 3, the JPEG 2000 image 100 corresponds to an object 54, while the tiles 98, color components 102, sub-bands 104, and layers 106 correspond to components 60. The JPEG 2000 algorithm converts an image file 96 into a JPEG 2000 image 100 referred to as a JPEG 2000 "codestream." The codestream is essentially an aggregation of the components 60 arranged in a particular order with a particular codestream header, or object tag 56. The JPEG 2000 codestream also includes component tags 62 for each of the components 60 to facilitate their identification and manipulation.

Depending on a particular selection and ordering of the components 60, a JPEG 2000 codestream contains different compressed versions of the original image file 96. The JPEG 2000 codestream syntax allows image presentation that varies in color, resolution, quality, and spatial location on the original image.

In an illustrative example, referring again to FIG. 8, where the requested object 54 is a JPEG 2000 image 100, the object components 60 comprise one or more tiles 98, and one or more color components 102, and/or one or more sub-bands 104, and/or one or more layers 106. The syntax of the JPEG 2000 algorithm dictates the order of the components 60 in response to a request. The requested object 54 can be the entire full-sized, full-color, full-resolution, and full-quality JPEG 2000 image 100, or the requested object 54 can be a subset of the full-sized, full-color, full-resolution, full-quality JPEG 2000 image 100. Examples of a subset of a JPEG 2000 image 100 include a central portion of a larger image, a grayscale version of a color image, a thumbnail of a higher-resolution image, or a reduced-quality version of the of a full-quality image.

In addition to identifying the extent of the full-sized, full-color, full-resolution, full-quality JPEG 2000 image 100, the request for object 54 can also identify a particular ordering of the requested object components 60. The ordering of the components 60 effects the presentation of a decompressed JPEG 2000 image 100. The components 60 can be ordered with respect to the tiles 98 to produce a presentation in progressive size, or progressively by location on the image, e.g., starting with the center tile(s) 98 and continuing with the remaining tiles 98 outward towards the image boarder. The components 60 can also be ordered with respect to the color components 102 to produce a presentation in progressive color, e.g., starting with a grayscale image, then progressing to a dual color image, and ultimately progressing to the full-color image. Alternatively, the components 60 can be ordered with respect to the sub-bands 104 to produce a presentation in progressive resolution, e.g., starting with a low-resolution image, then progressing to a higher-level resolution, and ultimately progressing to the resolution level of the requested object 54. The components 60 can also be ordered with respect to the layers 106 to produce a presentation in progressive quality, e.g., starting with a low-quality image, then progressing to a higher-quality image, and ultimately progressing to the quality level of the requested object 54.

Other variations are possible where a selected portion of the full-size, full-color, full-resolution, full-quality JPEG 2000 image is presented in any of the previously identified presentation modes, or where different segments of the requested JPEG 2000 image 100 are presented with varying size, color, resolution, or quality. One example would be a low-resolution image having a sub-region, such as the central region provided at a higher resolution.

In a first illustrative example, the regenerative cache system 42 has cached within the cache memory 46 a first object 54 comprising an ordered set of components 60 that define a particular presentation of the JPEG 2000 image file 100. In a first illustrative example, the first object 54 is the full-sized, full-color, full-resolution, full-quality JPEG 2000 image file 100, ordered for progressive resolution. When a subsequent request is received for a second object 54 that is related to the first object, such as a request for a lower-resolution version of the first image 54, the regenerative cache system 42 knows that it has the necessary components 60 within the cache memory 46 to construct the lower-resolution second image 54. The regenerative cache system then locates the necessary components 60 from the first cached object 54 and constructs the second object 54.

In another illustrative example, the first object 54 stored within the cache memory 46 is a reduced-resolution, or thumbnail presentation of the JPEG 2000 image file 100. Subsequently, a request is received for a second object 54 that is related to the first object 54, such as a request for a full-resolution presentation of the JPEG 2000 image 100 from which the thumbnail first object 54 was obtained. Again, the regenerative cache system 42 knows that it has the thumbnail component(s) 60 (the lower sub-band(s) 104) related to the second requested object 54 stored within the cache memory 46. The regenerative cache system 42 then determines the additional components 60 sufficient to construct the requested second object 54 when combined with the thumbnail components 60 and obtains those additional components from the one or more storage devices 22, 22', 40, 42. The regenerative cache system 42 can similarly serve requests for second objects 54 that differ from the first object 54 in color, quality, or even presentation ordering of the components 60.

Figure 9:
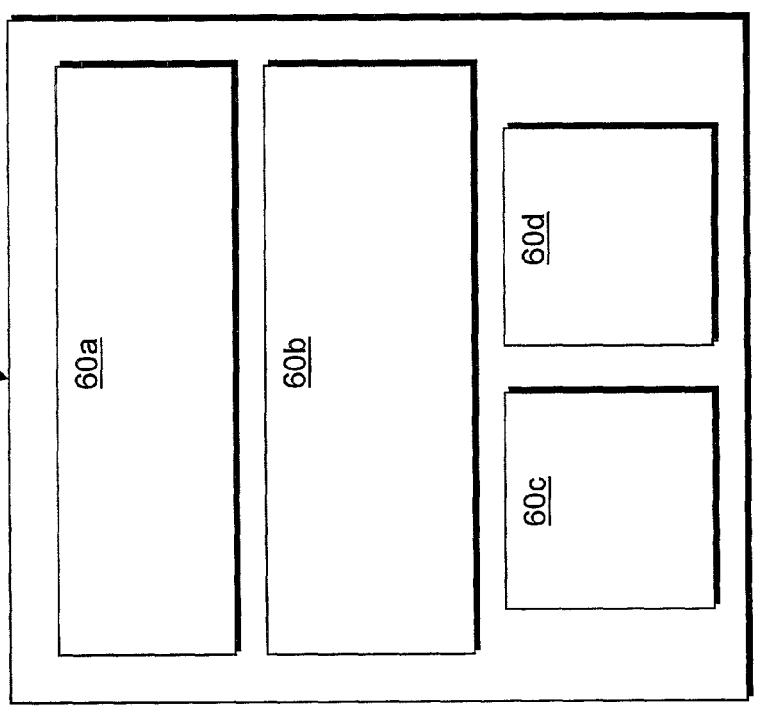
FIG. 9 is a general diagram illustrating an example of a compound document data object.

Referring to FIG. 9, in yet another embodiment the objects 54 are compound documents 108. The compound documents 108 are comprised of a plurality of document components 60a through 60d (generally 60). The document components 60 represent any identifiable subsection of a file. Examples of document components 60 include graphics, spreadsheets, chapters, sections, pages of text, slides, charts, graphs, drawings, and tables. Examples of compound documents include word processing documents, OLE documents, web documents, and slide presentations. Other examples of compound documents 108 include audio files where the document components 60 represent individual songs, or portions of songs of a multi-song compilation such as an audio compact disk (CD), an compressed digital audio file, such as an MP3 file, or individual tracks of a multi-track recording.

In one example, the compound document 108 is an OLE document and the document component 60 is an embedded spreadsheet. Here, a data processing system 20 responds to a request for a first compound document 108 by retrieving the compound document 108 from storage and caching the compound document 108, containing the spreadsheet document component 60 in the regenerative cache system 42. The regenerative cache system 42 can return the compound document 108 and cache the compound document 108 and component 60 separately. When the data processing system 20 receives a later request for a second document 108 different from the first document 108, but having the same embedded spreadsheet document component 60, the regenerative cache system 42 determines that the second compound document 108 is not cached, but the embedded spreadsheet component 60 is cached and contained within the first compound document 108 (or contained separately in the compound document 108 and the component 60 if cached separately). The regenerative cache system 42 retrieves the sufficient document components 60 for the second requested compound document 108, less the spreadsheet document component 60 already cached. The regenerative cache system 42 then combines the cached spreadsheet document component 60 with the remaining document components 60 retrieved from storage creating the requested second compound document 108. The regenerative cache system 42 can decide to cache some or all of the second compound document 108 to serve later requests. Other examples of compound documents 108 that are similarly handled by the regenerative cache system 42 include web compound documents 108, such as HTML documents with embedded components 60. The components of a web compound document 108 include items such as graphic components, text block components, frames, and applets.

Having shown the preferred embodiments, one skilled in the art will realize that many variations are possible within the scope and spirit of the claimed invention. It is therefore the intention to limit the invention only by the scope of the claims.

What is claimed is:

1. In a data processing system having a cache, a method for generating an uncached image comprising:
   locating a first component that is related to the uncached image, the first component including a component tag and a component payload, the component payload including image information, and the first component being present in either the cache or a storage system;
   locating a second component that is related to the uncached image in either of the cache, the storage system, or another storage system, the second component including a second component tag and a second component payload, the second component payload at least including additional image information; and
   constructing by the cache, the uncached image at least from the located first and second components.

2. The method of claim 1, further comprising obtaining the located first and second components.

3. The method of claim 1, further comprising deriving one or more of the first and second components from an object.

4. The method of claim 1, further comprising storing the constructed object in the cache.

5. The method of claim 1, further comprising generating, by the cache, a request for the image.

6. The method of claim 1, wherein the image is an image file.

7. The method of claim 6, wherein the image file is a JPEG-2000 file.

8. The method of claim 1, wherein the components constitute an image file.

9. The method of claim 8, wherein the image file is a JPEG-2000 file.

* * * * *